(12) United States Patent
Subramaniyam

(10) Patent No.: US 11,377,600 B2
(45) Date of Patent: Jul. 5, 2022

(54) HYDROGEN SULFIDE SCAVENGING ADDITIVE COMPOSITION AND METHOD OF USE THEREOF

(71) Applicant: Dorf Ketal Chemicals (India) Private Limited, Mumbai (IN)

(72) Inventor: Mahesh Subramaniyam, Mumbai (IN)

(73) Assignee: Dorf Ketal Chemicals (India) Private Limited, Mumbai (IN)

( * ) Notice: Subject to any disclaimer, the term of this patent is extended or adjusted under 35 U.S.C. 154(b) by 0 days.

(21) Appl. No.: 16/067,013

(22) PCT Filed: Dec. 26, 2016

(86) PCT No.: PCT/IB2016/058008
§ 371 (c)(1),
(2) Date: Jun. 28, 2018

(87) PCT Pub. No.: WO2017/118896
PCT Pub. Date: Jul. 13, 2017

(65) Prior Publication Data
US 2019/0010403 A1 Jan. 10, 2019

(30) Foreign Application Priority Data
Jan. 5, 2016 (IN) .............................. 201621000398

(51) Int. Cl.
*C10G 29/20* (2006.01)
*C10G 29/24* (2006.01)
*B01D 53/14* (2006.01)
*B01D 53/78* (2006.01)
*B01D 53/52* (2006.01)
*C10L 1/222* (2006.01)
*C10L 1/185* (2006.01)
*C10L 1/238* (2006.01)
*C10L 1/14* (2006.01)
*C10L 3/10* (2006.01)

(52) U.S. Cl.
CPC ......... *C10G 29/20* (2013.01); *B01D 53/1493* (2013.01); *B01D 53/52* (2013.01); *B01D 53/78* (2013.01); *C10G 29/24* (2013.01); *B01D 2251/208* (2013.01); *B01D 2252/20431* (2013.01); *B01D 2257/304* (2013.01); *B01D 2257/306* (2013.01); *C10G 2300/202* (2013.01); *C10G 2300/207* (2013.01); *C10L 1/143* (2013.01); *C10L 1/1857* (2013.01); *C10L 1/2222* (2013.01); *C10L 1/2225* (2013.01); *C10L 1/238* (2013.01); *C10L 3/103* (2013.01); *C10L 2200/043* (2013.01); *C10L 2230/02* (2013.01); *C10L 2290/545* (2013.01)

(58) Field of Classification Search
None
See application file for complete search history.

(56) References Cited

U.S. PATENT DOCUMENTS

| | | | |
|---|---|---|---|
| 1,991,765 A | 2/1935 | Marks | |
| 4,680,127 A | 7/1987 | Edmondson | |
| 5,085,842 A | 2/1992 | Porz et al. | |
| 6,294,220 B1* | 9/2001 | McGrath | C23C 22/52 148/272 |
| 6,666,975 B1 | 12/2003 | Chen et al. | |
| 2006/0116296 A1* | 6/2006 | Kippie | C09K 8/22 507/244 |
| 2012/0067783 A1* | 3/2012 | Kaplan | C10G 75/00 208/240 |
| 2013/0004393 A1 | 1/2013 | Menendez et al. | |
| 2014/0350313 A1 | 11/2014 | Subramaniyam | |

FOREIGN PATENT DOCUMENTS

| | | |
|---|---|---|
| IN | 201621000398 | 1/2016 |
| WO | 2012070065 A1 | 5/2012 |
| WO | 2017118896 A1 | 7/2017 |

OTHER PUBLICATIONS 122-20-3 CAS MSDS (Triisopropanolamine) Melting Point Boiling Point Density CAS Chemical Properties, https://www.chemicalbook.com/ChemicalProductProperty_US_CB7677311.aspx, retrieved Dec. 11, 2019 (Year: 2019).*
http://www.acarchemicals.com/sayfalar.asp?LanguageID=2&cid=3&id=2565&id2=3062, retrieved Dec. 11, 2019, p. 1 (Year: 2019).*
Mazgarov, A., et al., Removing Mercaptans and Hydrogen Suflide from Oil Products, 2003, Chemical and Petroleum Engineering, vol. 39, Nos. 11-12, pp. 719-721. (Year: 2003).*
U.S. Department of Energy, Office of Fossil Energy, 2009, Developing Refined Products Storage in the Strategic Petroleum Reserve, https://www.energy.gov/fe/articles/developing-refined-products-storage-strategic-petroleum-reserve (retrieved Aug. 14, 2020). (Year: 2009).*

(Continued)

*Primary Examiner* — Renee Robinson
(74) *Attorney, Agent, or Firm* — Conley Rose, P.C.; Rodney B. Carroll

(57) ABSTRACT

The present invention relates to an additive composition for scavenging hydrogen sulfide in hydrocarbons, wherein said additive composition comprises a combination of (a) glyoxal and (b) at least one aliphatic tertiary amine or oxide treated derivative thereof, or a mixture of the aliphatic tertiary amine and the oxide treated derivative thereof. In one embodiment it also relates to a method for scavenging hydrogen sulfide in hydrocarbons, and in another embodiment it relates to a method of using an additive composition of the present invention for scavenging hydrogen sulfide in hydrocarbons. In yet another embodiment it relates to a composition for scavenging hydrogen sulfide in hydrocarbons comprising (A) a hydrocarbon and (B) a hydrogen sulfide scavenging additive composition of the present invention.

10 Claims, No Drawings

(56) References Cited

OTHER PUBLICATIONS

Foreign communication from the priority International Application No. PCT/IB2016/058008, International Search Report and Written Opinion, dated Mar. 24, 2017, 8 pages.
Foreign communication from the priority International Application No. PCT/IB2016/058008, International Preliminary Report on Patentability of the International Preliminary Examining Authority, dated Apr. 12, 2018, 8 pages.

* cited by examiner

US 11,377,600 B2

HYDROGEN SULFIDE SCAVENGING ADDITIVE COMPOSITION AND METHOD OF USE THEREOF

CROSS REFERENCE TO RELATED APPLICATIONS

This application is a filing under 35 U.S.C. 371 of International Application No. PCT/IB2016/058008 filed Dec. 26, 2016, entitled "Hydrogen Sulfide Scavenging Additive Composition and Method of Use Thereof," which claims priority to Indian Patent Application No. 201621000398 filed Jan. 5, 2016, which applications are incorporated by reference herein in their entirety.

FIELD OF THE INVENTION

The present invention generally relates to an improved hydrogen sulfide scavenging additive composition and method of use thereof.

Particularly, it relates to an improved hydrogen sulfide scavenging additive composition comprising a combination at least of (a) glyoxal and (b) at least one aliphatic tertiary amine or at least one oxide treated derivative of an aliphatic tertiary amine, or a mixture thereof, a method of use thereof, and a method for scavenging hydrogen sulfide from hydrocarbons including hydrocarbon streams.

BACKGROUND OF THE INVENTION

The toxicity of hydrogen sulfide in hydrocarbons or hydrocarbon streams is well known in the industry and considerable expense and efforts are expended annually to reduce its content to a safe level.

In large production facilities, it is generally more economical to install a regenerative system for treating hydrogen sulphide streams. These systems typically employ a compound used in an absorption tower to contact the produced fluids and selectively absorb the hydrogen sulfide and possibly other toxic materials such as carbon dioxide and mercaptans. The absorption compound is then regenerated and reused in the system. Typical hydrogen sulfide absorption materials include alkanolamines, hindered amines, and the like, i.e. nitrogen containing compounds. However, such approach is not economically feasible for development stage of a field or in small producing fields.

For development stage of a field or in small producing fields where regenerative systems are not economical, it is necessary to treat the sour hydrocarbon production with non-regenerative scavengers.

The U.S. Pat. No. 1,991,765 [US'765] disclosed use of reaction of aldehyde and hydrosulfide in aqueous solution. Thereafter, use of aldehydes to remove or scavenge hydrogen sulfide was reported in many patents. Mainly aldehydes including formaldehyde, or glyoxal, or formaldehyde in combination with other aldehydes, or glyoxal in combination with other aldehydes have been used as hydrogen sulfide scavengers/removing agents. In the formaldehyde type reaction, the reaction produces a chemical complex known as formthionals (e.g., trithiane).

The non-regenerative scavengers for small plant hydrogen sulfide removal fall into four groups: aldehyde based, metallic oxide based, caustic based, and other processes.

In the removal of hydrogen sulfide by non-regenerative scavengers, the scavenger reacts with the hydrogen sulfide to form a nontoxic compound or a compound which can be removed from the hydrocarbon.

The U.S. Pat. No. 4,680,127 [US'127] reported use of glyoxal, or glyoxal in combination with other aldehydes in small amounts, which resulted in scavenging of hydrogen sulfide.

However, the main problem of this method is that it resulted in formation of water soluble products, which were stable only in alkaline pH of about 9, and decomposed in acidic pH of about 4.5 to 5.5.

The solution to above problem of US'127 was provided by U.S. Pat. No. 5,085,842 [US'842] which reported use of glyoxal, but in very high amounts at least of 15% by weight, preferably of 25 to 45% by weight.

The main problem of this solution is that glyoxal has to be employed in very high amounts, which also makes the process highly uneconomical. Additional problem of this method is that it results in products, which are prone to get deposited in the vessels and cause fouling meaning thereby additional anti-fouling additive will be required. Accordingly, as per the inventor of present invention, this method is neither economical nor industrially feasible and convenient.

The U.S. Pat. No. 6,666,975 [US'975] also reported use of glyoxal, but with aim to provide a method to reduce emission of hydrogen sulfide odor wherein products formed are water soluble and non-volatile. The US'975 does not aim to overcome problem of fouling in treatment of hydrocarbons which may be caused due to water insoluble products formed by use of glyoxal in higher amounts as reported in US'842, but only aims to avoid handling problems of glyoxal without any disclosure or teaching that how one can achieve hydrogen sulfide scavenging by reducing amounts of glyoxal, and without facing a) problem of fouling which may be caused by employing method of US'842 and b) problem of decomposition of products which may be water soluble products but decompose in acidic pH which may be caused by employing method of US'127. Even the US'975 does not discuss US'842 and US'127.

NEED OF THE INVENTION

Accordingly, there is still a need of an improved additive composition which, at least, comprises:
  substantially reduced amount of glyoxal,
  is also required in substantially reduced amount,
  is suitable for scavenging sulfur containing compounds including hydrogen sulfide and mercaptans, particularly hydrogen sulfide in the hydrocarbons or hydrocarbon streams,
  overcomes one or more of above-described problems of the prior art,
  wherein the additive composition is capable of increasing hydrogen sulfide scavenging efficiency of prior art composition consisting only of glyoxal; and
  wherein the additive composition is capable of scavenging the sulfur containing compounds not only at room temperature, but also at higher temperatures.

Therefore, the present invention primarily aims at providing a solution to one or more of above-described existing industrial problems by providing an improved additive composition for scavenging sulfur containing compounds including hydrogen sulfide and mercaptans, particularly hydrogen sulfide in hydrocarbons or hydrocarbon streams without causing any problem, wherein the additive composition, at least, comprises:
  substantially reduced amount of glyoxal,
  is also required in substantially reduced amount, is suitable for scavenging sulfur containing compounds including hydrogen sulfide and mercaptans, particularly hydrogen sulfide in the hydrocarbons or hydrocarbon streams, overcomes one or more of above-described problems of the prior art, wherein the additive composition is capable of increasing hydrogen sulfide scavenging efficiency of prior art composition consisting only of glyoxal; and wherein the additive composition is capable of scavenging the sulfur containing compounds not only at room temperature, but also at higher temperatures.

OBJECTS OF THE INVENTION

Accordingly, the main object of present invention is to provide an improved additive composition for scavenging sulfur containing compounds including hydrogen sulfide ($H_2S$) and mercaptans, particularly hydrogen sulfide ($H_2S$) in hydrocarbons or hydrocarbon streams and which, at least, reduces one or more of the above-discussed problems of the prior art, wherein the additive composition comprises:

substantially reduced amount of glyoxal, is also required in substantially reduced amount, is suitable for scavenging sulfur containing compounds including hydrogen sulfide and mercaptans, particularly hydrogen sulfide in the hydrocarbons or hydrocarbon streams, overcomes one or more of above-described problems of the prior art, wherein the additive composition is capable of increasing hydrogen sulfide scavenging efficiency of prior art composition consisting only of glyoxal; and wherein the additive composition scavenges the sulfur containing compounds not only at room temperature, but also at higher temperatures.

This is also an object of present invention to provide a method for scavenging sulfur containing compounds including hydrogen sulfide and mercaptans, particularly hydrogen sulfide in hydrocarbons or hydrocarbon streams by employing the presently provided additive composition of the present invention which comprises substantially reduced amount of glyoxal, and is also used in substantially reduced amount to scavenge the sulfur containing compounds, and wherein the additive composition is capable of increasing hydrogen sulfide scavenging efficiency of prior art composition consisting only of glyoxal; wherein the additive composition scavenges the sulfur containing compounds not only at room temperature, but also at higher temperatures.

This is also an object of present invention to provide a method of using the additive composition of the present invention for scavenging sulfur containing compounds including hydrogen sulfide and mercaptans, particularly hydrogen sulfide in hydrocarbons or hydrocarbon streams wherein additive composition comprises substantially reduced amounts of glyoxal, and thereby, makes the composition and its use economical, industrially feasible and convenient.

Other objects and advantages of present invention will become more apparent from the following description when read in conjunction with examples, which are not intended to limit scope of present invention.

DETAILED DESCRIPTION

With aim to overcome above-described problems of prior art and to achieve above-described objects of the invention, the inventor has found that when an hydrocarbon comprising sulfur containing compounds including hydrogen sulfide and/or mercaptans is treated with an additive composition comprising at least a combination of:

(a) glyoxal; and (b) at least one aliphatic tertiary amine or at least one oxide treated derivative of an aliphatic tertiary amine, or a mixture thereof, the sulfur containing compound including hydrogen sulfide is scavenged or removed.

With aim to overcome above-described problems of prior art and to achieve above-described objects of the invention, the inventor has also found that the scavenging of the sulfur containing compounds is achieved even when the additive composition of the present invention comprises a substantially reduced amount of glyoxal, and/or is used in a substantially reduced amount.

With aim to overcome above-described problems of prior art and to achieve above-described objects of the invention, the inventor has further found that the additive composition of the present invention not only demonstrates surprising and unexpected effects (synergistic effect) by scavenging the sulfur containing compounds at room temperature, but also at higher temperature.

Accordingly, in main embodiment, the present invention, relates to an additive composition for scavenging hydrogen sulfide in hydrocarbons, wherein said additive composition comprises a combination at least of:

(a) glyoxal; and (b) at least one aliphatic tertiary amine or at least one oxide treated derivative of an aliphatic tertiary amine, or a mixture thereof.

Accordingly, in another embodiment, the present invention, relates to a method for scavenging hydrogen sulfide in hydrocarbons, wherein the method comprises adding the additive composition of the present invention comprising a combination at least of:

(a) glyoxal; and (b) at least one aliphatic tertiary amine or at least one oxide treated derivative of an aliphatic tertiary amine, or a mixture thereof to the hydrocarbons containing sulfur containing compounds including hydrogen sulfide.

Accordingly, in still another embodiment, the present invention, relates to a method of using an additive composition comprising a combination at least of:

(a) glyoxal; and (b) at least one aliphatic tertiary amine or at least one oxide treated derivative of an aliphatic tertiary amine, or a mixture thereof.

for scavenging hydrogen sulfide in hydrocarbons, wherein the method comprises treating the hydrocarbons containing sulfur containing compounds including hydrogen sulfide with the additive composition of the present invention.

Accordingly, in yet another embodiment, the present invention, relates to a composition for scavenging hydrogen sulfide in hydrocarbons, wherein the composition comprises:

(A) a hydrocarbon comprising sulfur containing compounds; and (B) a hydrogen sulfide scavenging additive composition, wherein the hydrogen sulfide scavenging additive composition comprises a combination at least of:

(a) glyoxal; and (b) at least one aliphatic tertiary amine or at least one oxide treated derivative of an aliphatic tertiary amine, or a mixture thereof;

wherein the aliphatic tertiary amine or the oxide treated derivative of aliphatic tertiary amine is as described herein.

In accordance with one of the preferred embodiments of the present invention, the aliphatic tertiary amine comprises tri-isopropanolamine (TIPA).

In accordance with one of the preferred embodiments of the present invention, the aliphatic tertiary amine comprises N,N,N',N'-Tetrakis (2-hydroxyethyl) ethylene-diamine (THEED).

In accordance with one of the preferred embodiments of the present invention, the aliphatic tertiary amine comprises N,N,N',N' tetrakis (2-hydroxypropyl) ethylene-diamine (Quadrol®).

In accordance with one of the preferred embodiments of the present invention, the oxide treated derivative of aliphatic tertiary amine comprises ethylene oxide (EO) derivative of tri-isopropanolamine (EO-TIPA).

In accordance with one of the preferred embodiments of the present invention, the oxide treated derivative of the aliphatic tertiary amine comprises propylene oxide (PO) derivative of tri-isopropanolamine (PO-TIPA).

In accordance with one of the preferred embodiments of the present invention, the oxide treated derivative of the aliphatic tertiary amine comprises ethylene oxide (EO) derivative of triethanolamine (EO-TEA).

In accordance with one of the preferred embodiments of the present invention, the oxide treated derivative of aliphatic tertiary amine comprises propylene oxide (PO) derivative of triethanolamine (PO-TEA).

In accordance with one of the preferred embodiments of the present invention, the aliphatic tertiary amine comprises tri-isopropanolamine (TIPA), N,N,N',N'-Tetrakis (2-hydroxyethyl) ethylene-diamine (THEED), N,N,N',N' tetrakis (2-hydroxypropyl) ethylene-diamine (Quadrol®), or a mixture thereof.

In accordance with one of the preferred embodiments of the present invention, the oxide treated derivative of aliphatic tertiary amine comprises ethylene oxide (EO) derivative of tri-isopropanolamine (EO-TIPA), propylene oxide (PO) derivative of tri-isopropanolamine (PO-TIPA), ethylene oxide (EO) derivative of triethanolamine (EO-TEA), propylene oxide (PO) derivative of triethanolamine (PO-TEA), or a mixture thereof.

With aim to overcome above-described problems of prior art and to achieve above-described objects of the invention, the inventor has further found that when the composition comprises triethanolamine (TEA), monoethanolamine (MEA), diethanolamine (DEA), or tetraethylenepentaamine (TEPA), the hydrogen sulfide scavenging efficiency of the prior art additive increase, but it does not increase to a substantial level to be economical for the industry.

Therefore, in one embodiment of the present invention, the additive composition of the present invention does not comprise triethanolamine (TEA), monoethanolamine (MEA), diethanolamine (DEA), and tetraethylenepentaamine (TEPA).

In accordance with one of the preferred embodiments of the present invention, the hydrocarbon comprises hydrocarbon stream including crude oil, fuel oil, sour gas, asphalts and refined products contained in storage tanks, vessels, and pipelines.

In accordance with one of the preferred embodiments of the present invention, the hydrogen sulfide containing compounds comprise sulfur containing compounds, or mercaptans, or mixture thereof.

In accordance with yet another embodiment, the present invention relates to a method for scavenging hydrogen sulphide in hydrocarbon comprising sulfur containing compounds, wherein the method comprises contacting the hydrocarbon with the hydrogen sulfide scavenging additive composition of the present invention as described herein.

In accordance with still another embodiment, the present invention relates to a method of using the hydrogen sulfide scavenging additive composition for scavenging hydrogen sulphide in hydrocarbon comprising sulfur containing compounds, wherein the method comprises adding to the hydrocarbon the hydrogen sulfide scavenging additive composition of the present invention as described herein.

In accordance with one of the preferred embodiments of the present invention, the hydrocarbon comprises or includes hydrocarbon stream comprising or including, but not limited to crude oil, fuel oil, sour gas, asphalts and refined products contained in storage tanks, vessels, and pipelines.

In accordance with one of the preferred embodiments of the present invention, the hydrogen sulfide includes or comprises sulfur containing compounds and mercaptans.

Accordingly, in accordance with one of the preferred embodiments of the present invention, in carrying out the method of scavenging or method of use of the present additive composition for scavenging the hydrogen sulfide in hydrocarbon or hydrocarbon stream, the scavenging additive composition is added to the hydrocarbon or gas stream or hydrocarbon stream in a concentration sufficient to substantially scavenge hydrogen sulfide therein.

In accordance with one of the preferred embodiments of the present invention, the scavenging additive composition is added in an amount varying from about 0.1 to about 4000 ppm, preferably from about 1 to about 3000 ppm, more preferably from about 5 to about 2000 ppm by weight of the hydrocarbon or the hydrocarbon stream in method of use of the present additive composition and in a method for scavenging sulfur containing compounds in the hydrocarbons or the hydrocarbon streams by employing the present additive composition.

In accordance with one of the preferred embodiments of the present invention, the mixture of components of the present invention may be obtained by mixing component (a) and component (b) of the present invention in any weight (or mole) ratio.

In accordance with one of the preferred embodiments of the present invention, the hydrogen sulfide scavenging may be carried at a suitable temperature.

The inventor has further found that when the additive composition of the present invention is employed, it scavenges the sulfur containing compounds in the hydrocarbons or the hydrocarbon streams much faster than additive consisting only of glyoxal.

It may be noted that when same amount of the additive composition consisting (only) of glyoxal, and the present additive composition comprising glyoxal and the aliphatic tertiary amine or the oxide treated derivative of aliphatic tertiary amine, or a mixture thereof were used to scavenge sulfur containing compounds in the hydrocarbon for two hours, the percent efficiency to scavenge the sulfur containing compounds by the present additive composition was found to substantially increase than the additive consisting of glyoxal, which confirms that the additive composition of the present invention also acts at a faster rate to scavenge the sulfur containing compounds in the hydrocarbons or the hydrocarbon streams than the additive consisting of glyoxal.

From the foregoing description and following supported examples, a reference to which is drawn here, it may be concluded that:

Efficiency of glyoxal for hydrogen sulphide scavenging improves substantially on addition of the aliphatic tertiary amine or the oxide treated derivative of aliphatic tertiary amine, or a mixture thereof of the present invention (which may also be referred to as "Co-Additive" of the present invention) both at room temperature and at high temperature (for example, at 80° C.);

The improvement in efficiency of glyoxal for hydrogen sulphide scavenging is substantially much higher on addition of the Co-Additive of the present invention at high temperature (for example, at 80° C.) as compared to that at room temperature;

As described above, the main problem of using glyoxal in higher amounts is that it makes the process highly uneconomical, industrially infeasible and inconvenient. Additionally, use of higher amounts of glyoxal results in water insoluble products, which are prone to get deposited in the vessels, and thereby, cause fouling. Therefore, as the required amount of glyoxal is substantially reduced in the additive composition of the present invention, the problems associated with higher amount of glyoxal get overcome.

In accordance with one of the preferred embodiments of present invention, the scavenging additive composition of the present invention may be injected in the flow lines in case of development stage of a field or in small producing fields, or the gas containing hydrogen sulfide may be passed through an absorption tower wherein scavenging additive composition of the present invention has been injected in case of large production facilities.

The scavenging additive composition and the method of the present invention may be used in scavenging hydrogen sulphide and mercaptans from hydrocarbons or hydrocarbon streams including crude oil, fuel oil, sour gas, asphalts and refined products contained in storage tanks, vessels, and pipelines.

In accordance with one of the embodiments of the present invention, the additive composition may be used to scavenge the sulfur containing compounds including hydrogen sulfide and mercaptans from the crude oil when it is passing through the desalter or is being treated with wash water in the crude oil processing system.

In accordance with one of the embodiments of the present invention, the prior art additive glyoxal of any activity may be used in present.

The molecular weight or average molecular weight of the additive may be measured by any known technique, for example by the gel permeation chromatography (GPC) in Daltons.

The abbreviations used in the present application have following meaning:

TIPA is Tri-IsoPropanolAmine, and is Aliphatic Tertiary Amine. In the present experiments, TIPA used is 99% pure (active);

THEED is Aliphatic Tertiary Amine, its chemical name is N,N,N',N'-Tetrakis (2-hydroxyethyl) ethylene-diamine, or alternatively also known as (2,2',2",2"'-(1,2-Ethanediyldinitrilo)tetraethanol);

Quadrol® is Aliphatic Tertiary Amine, and its chemical name is: N,N,N',N' tetrakis (2-hydroxypropyl) ethylene-diamine EO-TIPA or ethoxylated TIPA is ethylene oxide (EO) derivative of TIPA, which may be obtained by reacting 1 mole of TIPA with at least 1 mole of ethylene oxide (EO). For example, the ethoxylated TIPA may be obtained by reacting 1 mole of TIPA with 1 to 50 moles of ethylene oxide (EO). The ethylene oxide of various molecular weights may be used to prepare the EO-TIPA to result in desired additive of varying molecular weights. For example, the additive may have molecular weight varying from 400 to 1200 Daltons, preferably from 700-800 Daltons may be used.

PO-TIPA or propoxylated TIPA is propylene oxide (PO) derivative of TIPA, which may be obtained by reacting 1 mole of TIPA with at least 1 mole of propylene oxide (PO). For example, the propoxylated TIPA may be obtained by reacting 1 mole of TIPA with 1 to 50 moles of propylene oxide (PO). The propylene oxide of various molecular weights may be used to prepare the PO-TIPA to result in desired additive of varying molecular weights. For example, the additive may have molecular weight varying from 300 to 1500 Daltons, preferably from 300 to 750 Daltons, preferably from 1100 to 1300 Daltons may be used.

TEA is TriEthanolAmine;

EO-TEA or ethoxylated TEA is ethylene oxide (EO) derivative of TEA, which may be obtained by reacting 1 mole of TEA with at least 1 mole of ethylene oxide (EO). For example, the ethoxylated TEA may be obtained by reacting 1 mole of TEA with 1 to 50 moles of ethylene oxide (EO). The ethylene oxide of various molecular weights may be used to prepare the EO-TEA to result in desired additive of varying molecular weights. For example, the additive may have molecular weight varying from 400 to 1300 Daltons, preferably from 900-1300 Daltons, preferably from 1000 to 1250 Daltons may be used.

PO-TEA or propoxylated TEA is propylene oxide (PO) derivative of TEA, which may be obtained by reacting 1 mole of TEA with at least 1 mole of propylene oxide (PO). For example, the propoxylated TEA may be obtained by reacting 1 mole of TEA with 1 to 50 moles of propylene oxide (PO). The propylene oxide of various molecular weight may be used to prepare the PO-TEA to result in desired additive of varying molecular weights. For example, the additive may have molecular weight varying from 800 to 2400 Daltons, preferably from 1000-2200 Daltons, preferably from 1000 to 2150 Daltons may be used.

MEA is MonoEthanolAmine,

DEA is DiEthanol Amine;

TEPA is TetraEthylene PentaAmine.

The present invention is now described with the help of following examples, which are not intended to limit scope of present invention, but have been incorporated to illustrate advantages of present invention and best mode to perform it. The following examples also demonstrate surprising effectiveness of scavenging additive composition of present invention.

EXAMPLES

The $H_2S$ was purged in 100 ml of kerosene till concentration of $H_2S$ vapor reaches to 2000 ppm in blank sample [Blank-I]. To the resulted solution, a dosage of the prior art additive and the additive composition of the present invention as given in following tables was added with shake time of 1 min, and $H_2S$ scavenging capabilities were measured at room temperature (RT) and at 80° C. after 2 hrs. The results are presented in following Tables I to VI.

In the present examples, the glyoxal used is of 40% activity.

TABLE I

| Prior Art Additive (250 ppm) | Invention Additive (Co-Additive) of the Present Invention (12.5 ppm) | With 250 ppm dosage of Glyoxal | | |
|---|---|---|---|---|
| | | H2S, ppm (Vapor) | % Efficiency (at RT) | % Improvement with present Composition |
| Blank | | 1800 | | |
| Glyoxal | | 1200 | 33.3 | |
| Glyoxal | TIPA | 500 | 72.2 | 116.82 |
| Glyoxal | EO-TIPA | 200 | 88.9 | 166.97 |
| Glyoxal | PO-TIPA | 300 | 85 | 155.26 |

TABLE II

| Prior Art Additive (500 ppm) | Invention Additive (Co-Additive) of the Present Invention (12.5 ppm) | With 500 ppm dosage of Glyoxal | | |
|---|---|---|---|---|
| | | H2S, ppm (Vapor) | % Efficiency (at RT) | % Improvement with present Composition |
| Blank | | 1800 | | |
| Glyoxal | | 750 | 58.3 | |
| Glyoxal | TIPA | 200 | 88.9 | 52.49 |
| Glyoxal | EO-TIPA | 100 | 94.4 | 61.92 |
| Glyoxal | PO-TIPA | <5 | 99.8 | 71.18 |

TABLE III

| Prior Art Additive (250 ppm) | Invention Additive (Co-Additive) of the Present Invention (12.5 ppm) | With 250 ppm dosage of Glyoxal | | |
|---|---|---|---|---|
| | | H2S, ppm (Vapor) | % Efficiency (at 80° C.) | % Improvement with present Composition |
| Blank | | 1900 | | |
| Glyoxal | | 1700 | 10.5 | |
| Glyoxal | TIPA | 900 | 50 | 376.19 |
| Glyoxal | EO-TIPA | 850 | 55.3 | 426.67 |
| Glyoxal | PO-TIPA | 500 | 75 | 614.29 |

TABLE IV

| Prior Art Additive (500 ppm) | Invention Additive (Co-Additive) of the Present Invention (12.5 ppm) | With 500 ppm dosage of Glyoxal | | |
|---|---|---|---|---|
| | | H2S, ppm (Vapor) | % Efficiency (at 80° C.) | % Improvement with present Composition |
| Blank | | 1900 | | |
| Glyoxal | | 1500 | 21 | |
| Glyoxal | TIPA | 675 | 64.7 | 208.10 |
| Glyoxal | EO-TIPA | 550 | 71 | 238.10 |
| Glyoxal | PO-TIPA | 100 | 95 | 352.38 |

The experimental results of Tables I to IV confirm that the composition of the present invention comprising a combination at least of (a) glyoxal, and (b) aliphatic tertiary amine, wherein the aliphatic tertiary amine comprises TIPA, EO-TIPA or PO-TIPA is synergistic, and has demonstrated surprising and unexpected effects over the prior art composition consisting only of glyoxal.

TABLE V

| Additive | Dosage (in ppm) as such | Efficiency (% at RT, 28° C.) | Efficiency (% at 80° C.) |
|---|---|---|---|
| Glyoxal | 250 | 35 | 10 |
| [Prior Art Composition] | 500 | 60 | 20 |
| | 1000 | 70 | 20 |
| TIPA | 5 | 0 | |
| [Invention Additive, BUT when taken alone] | 10 | 0 | |
| | 15 | 0 | |
| | 20 | 5 | |
| | 25 | 5 | |
| Glyoxal and Monoethanol amine (MEA) | 250 + 12.5 | 45 | 25 |
| [Comparative Composition] | 250 + 25 | 50 | 25 |
| | 500 + 25 | 65 | 30 |
| | 500 + 50 | 65 | 40 |
| Glyoxal and Diethanol amine (DEA) | 250 + 12.5 | 35 | 20 |
| [Comparative Composition] | 250 + 25 | 40 | 25 |
| | 500 + 25 | 60 | 25 |
| | 500 + 50 | 60 | 25 |
| Glyoxal and Triethanol amine (TEA) | 250 + 12.5 | 30 | 20 |
| [Comparative Composition] | 250 + 25 | 30 | 25 |
| | 500 + 25 | 60 | 25 |
| | 500 + 50 | 65 | 25 |
| Glyoxal and Tetraethylene pentaamine (TEPA) | 250 + 12.5 | 40 | 25 |
| [Comparative Composition] | 250 + 25 | 45 | 30 |
| | 500 + 25 | 60 | 35 |
| | 500 + 50 | 65 | 40 |
| Glyoxal and TIPA (99%) | 250 + 12.5 | 72 | 50 |
| [Invention Composition] | 250 + 25 | 80 | 55 |
| | 250 + 50 | 85 | 60 |
| | 500 + 25 | 89 | 65 |
| | 500 + 50 | 92 | 70 |
| | 500 + 100 | 95 | 73 |

TABLE V-continued

| Additive | Dosage (in ppm) as such | Efficiency (% at RT, 28° C.) | Efficiency (% at 80° C.) |
|---|---|---|---|
| Glyoxal and THEED | 250 + 12.5 | 75 | 55 |
| [Invention Composition] | 250 + 25 | 85 | 60 |
|  | 500 + 25 | 90 | 70 |
|  | 500 + 50 | 95 | 75 |
| Glyoxal and Quadrol ® | 250 + 12.5 | 60 | 45 |
| [Invention or Comparative Composition] | 250 + 25 | 65 | 50 |
|  | 500 + 25 | 70 | 50 |
|  | 500 + 50 | 80 | 55 |

H2S Scavenging Efficiency of Composition Consisting of Glyoxal
[Prior Art Composition]
Firstly, the experimental data in above Table V confirms that the H$_2$S scavenging efficiency of the prior art composition deteriorates on higher temperature.
Secondly, the prior art composition consisting (only) of glyxoal does not show H$_2$S scavenging efficiency at higher temperature, because even with 1000 ppm dosage thereof only 20% scavenging of H$_2$S could be achieved. Even at lower temperature only 70% scavenging of H$_2$S could be achieved with substantially higher dosage of 1000 ppm.

H2S Scavenging Efficiency of Composition Consisting of TIPA
[Invention Additive, but when Taken Alone]
The invention additive TIPA when taken alone does not show efficiency to scavenge H$_2$S, because with dosage of 25 ppm it could only achieve 5% scavenging of H$_2$S. Therefore, the invention additive per se (i.e. when taken alone) of the present invention is not a H$_2$S scavenging additive.

H2S Scavenging Efficiency of Composition comprising Glyoxal and Monoethanol amine (MEA)
[Comparative Composition]
The comparative composition comprising glyoxal and MEA does not show improvement in H$_2$S scavenging efficiency of the prior art composition consisting (only) of glyxoal, because even with addition of 50 ppm of MEA in 500 ppm of glyoxal the H$_2$S scavenging efficiency of glyoxal was increased merely from 20% to 40% at higher temperature, and from 60% to 65% at lower temperature.

H2S Scavenging Efficiency of Composition comprising Glyoxal (40%) and Diethanol amine (DEA)
[Comparative Composition]
The comparative composition comprising glyoxal and DEA also did not show improvement in H$_2$S scavenging efficiency of the prior art composition consisting (only) of glyxoal, because even with addition of 50 ppm of DEA in 500 ppm of glyoxal the H$_2$S scavenging efficiency of glyoxal was increased very marginally from 20% to 25% at higher temperature, and at lower temperature it did not show any improvement at all, i.e. it remained at 60%.

H2S Scavenging Efficiency of Composition comprising Glyoxal (40%) and Triethanol amine (TEA)
[Comparative Composition]
The comparative composition comprising glyoxal and TEA also did not show improvement in H$_2$S scavenging efficiency of the prior art composition consisting (only) of glyxoal, because even with addition of 50 ppm of TEA in 500 ppm of glyoxal the H$_2$S scavenging efficiency of glyoxal was increased very marginally from 20% to 25% at higher temperature, and at lower temperature it had shown very marginal improvement from 60% to 65%.

H2S Scavenging Efficiency of Composition comprising Glyoxal and Tetraethylene pentaamine (TEPA)
[Comparative Composition]
The comparative composition comprising glyoxal and TEPA also did not show improvement in H$_2$S scavenging efficiency of the prior art composition consisting (only) of glyxoal, because even with addition of 50 ppm of TEPA in 500 ppm of glyoxal the H$_2$S scavenging efficiency of glyoxal was increased very marginally from 20% to 40% at higher temperature, and at lower temperature it had shown very marginal improvement from 60% to 65%.

H2S Scavenging Efficiency of Composition comprising Glyoxal and TIPA
[Invention Composition]
The combination of the present invention comprising glyoxal and TIPA has been surprisingly and unexpectedly found to be synergistic as it improves H$_2$S scavenging efficiency of compositions consisting (only) of glyoxal at higher temperature from 20% for 500 ppm dosage to 65% or 70% merely on addition of 25 or 50 ppm of TIPA to 500 ppm of glyoxal. Similarly, the synergistic effect of the present invention could also be seen even at lower temperature, wherein the H$_2$S scavenging efficiency of glyoxal improves from 60% to 92% or 95% merely on addition of 50 or 100 ppm of TIPA to 500 ppm of glyoxal.

H2S Scavenging Efficiency of Composition comprising Glyoxal and THEED
[Invention Composition]
The combination of the present invention comprising glyoxal and THEED has also been surprisingly and unexpectedly found to be synergistic as it also improves H$_2$S scavenging efficiency of prior art composition not only at lower temperature, but also at higher temperature from 20% for 500 ppm dosage to 70% or 75% merely on addition of 25 or 50 ppm of THEED to 500 ppm of glyoxal, and at room temperature from 60% to 90% or 95% merely on addition of 25 or 50 ppm of TIPA to 500 ppm of glyoxal.

H2S Scavenging Efficiency of Composition comprising Glyoxal and Quadrol®
[Invention Composition]
The combination of the present invention comprising glyoxal and Quadrol has been surprisingly and unexpectedly found to be synergistic as it improves H$_2$S scavenging efficiency of compositions consisting (only) of glyxoal at higher temperature from 20% for 500 ppm dosage to 55% merely on addition of 50 ppm of Quadrol to 500 ppm of glyoxal. Similarly, the synergistic effect of the present invention could also be seen even at lower temperature, wherein the H$_2$S scavenging efficiency of glyoxal improves from 60% to 80% on addition of 50 ppm of Quadrol to 500 ppm of glyoxal.

TABLE VI

| Composition | Dosage (in ppm) as such | Efficiency, % (RT, 28° C.) | Efficiency, % (80° C.) |
|---|---|---|---|
| Glyoxal and Ethoxylated TEA | 250 + 12.5 | 50 | 45 |
| [Mol. Wt. 1056 Daltons] | 250 + 25 | 60 | 50 |
| [Invention Composition] | 500 + 25 | 75 | 55 |
|  | 500 + 50 | 80 | 60 |
| Glyoxal and Ethoxylated TEA | 250 + 12.5 | 65 | 50 |
| [Mol. Wt. 1222 Daltons] | 250 + 25 | 70 | 55 |
| [Invention Composition] | 500 + 25 | 80 | 55 |
|  | 500 + 50 | 85 | 60 |
| Glyoxal and Propoxylated TEA | 250 + 12.5 | 65 | 50 |
| [Mol. Wt. 1163 Daltons] | 250 + 25 | 75 | 55 |
| [Invention Composition] | 500 + 25 | 85 | 60 |
|  | 500 + 50 | 90 | 65 |
| Glyoxal and Propoxylated TEA | 250 + 12.5 | 70 | 55 |
| [Mol. Wt.-1678 Daltons] | 250 + 25 | 80 | 60 |
| [Invention Composition] | 500 + 25 | 90 | 70 |
|  | 500 + 50 | 93 | 75 |
| Glyoxal and Propoxylated TEA | 250 + 12.5 | 70 | 55 |
| [Mol. Wt. 2085 Daltons] | 250 + 25 | 85 | 65 |
| [Invention Composition] | 500 + 25 | 93 | 70 |
|  | 500 + 50 | 95 | 75 |

The experimental data in Table VI confirms that the $H_2S$ scavenging efficiency of glyoxal (and of TEA) improves on addition of EO-TEA (on ethoxylation of TEA).

The experimental data in Table VI also confirms that the $H_2S$ scavenging efficiency of glyoxal (and of TEA) improves on addition of PO-TEA (or on propoxylation of TEA).

The foregoing examples confirm synergistic effects, i.e. surprising and unexpected effects of the present invention over the prior art.

Therefore, the foregoing experiments confirm that glyoxal is capable of scavenging $H_2S$. However, when the present composition comprising a combination of glyoxal and one or more aliphatic tertiary amine or one or more oxide treated derivative of aliphatic tertiary amine, or a mixture is used, the $H_2S$ scavenging efficiency of glyoxal is, surprisingly and unexpectedly, substantially increased confirming synergistic effect of the scavenging additive composition of the present invention.

The above experimental findings confirm surprising and unexpected technical effects and advantages, and synergistic property of the presently provided hydrogen sulfide scavenging additive compositions.

The above findings also confirm that compositions of the present invention have technical advantages and surprising effects over the prior art and comparative additives and compositions.

It may be noted that the present invention has been described with the help of foregoing examples, which are not intended to limit scope of the present invention, but are only illustrative.

Furthermore, as amount of the prior art additive (i.e. glyoxal) has been substantially reduced to achieve desired scavenging efficiency, the present compositions are more economical and environmental friendly.

It may be noted that the term "about" as employed herein is not intended to enlarge scope of claimed invention, but has been incorporated only to include permissible experimental errors of the field of the present invention.

The invention claimed is:

1. A composition for scavenging hydrogen sulfide, wherein the composition comprises:
    (a) a hydrocarbon comprising sulfur containing compounds; and
    (b) a hydrogen sulfide scavenging additive composition; wherein the hydrogen sulfide scavenging additive composition consists of a combination of:
    (A) glyoxal; and
    (B) at least one aliphatic tertiary amine or oxide treated derivative thereof, or a mixture of the aliphatic tertiary amine and the oxide treated derivative thereof;
    wherein the aliphatic tertiary amine or the oxide treated derivative thereof is selected from the group consisting of:
    (i) N,N,N',N'-Tetrakis (2-hydroxyethyl) ethylene-diamine (THEED);
    (ii) N,N,N',N' tetrakis (2-hydroxypropyl) ethylene-diamine;
    (iii) ethylene oxide (EO) derivative of tri-isopropanolamine (EO-TIPA);
    (iv) propylene oxide (PO) derivative of tri-isopropanolamine (PO-TIPA);
    (v) ethylene oxide (EO) derivative of triethanolamine (EO-TEA);
    (vi) propylene oxide (PO) derivative of triethanolamine (PO-TEA); and
    (vii) a mixture thereof;
    wherein the composition does not comprise:
    i) triethanolamine (TEA);
    ii) monoethanolamine (MEA);
    iii) diethanolamine (DEA); and
    iv) tetraethylenepentaamine (TEPA).

2. The composition as claimed in claim 1, wherein the hydrocarbon comprises a hydrocarbon stream.

3. The composition as claimed in claim 2, wherein the hydrocarbon stream comprises sulfur containing compounds selected from hydrogen sulfide, mercaptans, or a mixture thereof.

4. The composition as claimed in claim 2, wherein the hydrocarbon stream is crude oil, fuel oil, sour gas, asphalt or refined product.

5. The composition as claimed in claim 4, wherein the refined products are contained in storage tanks, vessels, or pipelines.

6. A method of using hydrogen sulfide scavenging additive composition for scavenging hydrogen sulphide in hydrocarbon comprising sulfur containing compounds, wherein the method comprises adding to the hydrocarbon the hydrogen sulfide scavenging additive composition, wherein the composition consists of a combination of:
    (a) glyoxal; and
    (b) at least one aliphatic tertiary amine or at least one oxide treated derivative of an aliphatic tertiary amine, or a mixture thereof;
    wherein the aliphatic tertiary amine or oxide treated derivative thereof is selected from the group consisting of:
    (i) N,N,N',N'-Tetrakis (2-hydroxyethyl) ethylene-diamine (THEED);
    (ii) N,N,N',N' tetrakis (2-hydroxypropyl) ethylene-diamine;
    (iii) ethylene oxide (EO) derivative of tri-isopropanolamine (EO-TIPA);
    (iv) propylene oxide (PO) derivative of tri-isopropanolamine (PO-TIPA);
    (v) ethylene oxide (EO) derivative of triethanolamine (EO-TEA);
    (vi) propylene oxide (PO) derivative of triethanolamine (PO-TEA); and
    (vii) a mixture thereof.

7. The method as claimed in claim 6, wherein the hydrocarbon comprises a hydrocarbon stream.

8. The method as claimed in claim 7, wherein the hydrocarbon stream comprises sulfur containing compounds selected from sulfide, mercaptans, or a mixture thereof.

9. The method as claimed in claim 7, wherein the hydrocarbon stream is crude oil, fuel oil, sour gas, asphalt or refined product.

10. The method as claimed in claim 9, wherein the refined products are contained in storage tanks, vessels, or pipelines.

* * * * *